United States Patent
Lee et al.

(10) Patent No.: US 12,009,500 B2
(45) Date of Patent: Jun. 11, 2024

(54) POWER NET SYSTEM OF A FUEL CELL AND A METHOD FOR CONTROLLING SAME

(71) Applicants: HYUNDAI MOTOR COMPANY, Seoul (KR); KIA CORPORATION, Seoul (KR)

(72) Inventors: Jong Hyun Lee, Yongin-si (KR); Ju Han Kim, Yongin-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 388 days.

(21) Appl. No.: 17/481,172

(22) Filed: Sep. 21, 2021

(65) Prior Publication Data

US 2022/0173460 A1 Jun. 2, 2022

(30) Foreign Application Priority Data

Nov. 27, 2020 (KR) .................. 10-2020-0162436

(51) Int. Cl.
| | |
|---|---|
| H02J 7/00 | (2006.01) |
| B60L 50/75 | (2019.01) |
| H01M 8/04858 | (2016.01) |
| H01M 8/10 | (2016.01) |
| H01M 16/00 | (2006.01) |

(52) U.S. Cl.
CPC .......... *H01M 16/006* (2013.01); *B60L 50/75* (2019.02); *H01M 8/04895* (2013.01); *H01M 8/10* (2013.01); *H01M 2008/1095* (2013.01)

(58) Field of Classification Search
None
See application file for complete search history.

(56) References Cited

U.S. PATENT DOCUMENTS

| | | | |
|---|---|---|---|
| 10,220,724 B2 | 3/2019 | Kim | |
| 2003/0106726 A1* | 6/2003 | Yoshii | B60L 58/40 |
| | | | 903/917 |
| 2008/0044694 A1* | 2/2008 | Lee | H01M 10/44 |
| | | | 429/432 |
| 2017/0305297 A1 | 10/2017 | Kim | |
| 2021/0175527 A1 | 6/2021 | Lee et al. | |

FOREIGN PATENT DOCUMENTS

| | | |
|---|---|---|
| KR | 101836624 B1 | 3/2018 |
| KR | 20210072223 A | 6/2021 |

\* cited by examiner

*Primary Examiner* — Arun C Williams
(74) *Attorney, Agent, or Firm* — Lempia Summerfield Katz LLC

(57) ABSTRACT

A power net system of a fuel cell and a method for controlling the same are provided. The power net system includes: a fuel cell to generate electric power through a reaction of a fuel gas and an oxidation gas; batteries to be charged by the electric power generated by the fuel cell or discharged to supply electric power; main lines electrically connecting the fuel cell and the batteries; main relays provided in the main lines to open or allow electrical connections between the fuel cell and the batteries; COD lines branched from the main lines between the fuel cell and the main relays and provided with a COD device to consume input electric power; COD relays provided in the COD lines to open or allow electrical connections to the COD device through the COD lines; and a controller to control the main relays or the COD relays to supply electric power charged in the batteries to the fuel cell.

15 Claims, 5 Drawing Sheets

POWER NET SYSTEM OF A FUEL CELL AND A METHOD FOR CONTROLLING SAME

CROSS REFERENCE TO RELATED APPLICATION

The present application claims priority to Korean Patent Application No. 10-2020-0162436, filed Nov. 27, 2020, the entire contents of which are incorporated herein for all purposes by this reference.

BACKGROUND

1. Field of the Disclosure

The present disclosure relates to a power net system of a fuel cell and a method for controlling the same. More particularly, the present disclosure relates to a technology for removing hydrogen from an air electrode when a fuel cell is restarted or when a FC stop mode is released.

2. Description of the Prior Art

A fuel cell converts chemical energy into electric energy by using an oxidation-reduction reaction between hydrogen and oxygen supplied from a hydrogen supply device and an air supply device, respectively. The fuel cell includes a fuel cell stack for producing electric energy, a cooling system for cooling the same, and the like.

In other words, hydrogen is supplied to the anode of the fuel cell and a hydrogen oxidation reaction proceeds in the anode. Thus, protons and electrons are generated. The generated protons and electrons move to the cathode through an electrolyte membrane and an external wire, respectively. The cathode generates electric energy through an electrochemical reaction between the protons and electrons from the anode and oxygen in the air.

Inside the fuel cell, gases pass through the electrolyte membrane due to diffusion resulting from a difference in partial pressure between gases (crossover phenomenon). Particularly, there is a problem in that air supply to the cathode is blocked while the fuel cell does not produce electric power. If air is supplied to the cathode after power generation by the fuel cell is resumed by hydrogen that crosses over from the anode to the cathode, the same is discharged outwards through an air processing line.

More specifically, if high-concentration hydrogen is discharged outwards and if static electricity or sparks occur in a nearby position, there is a risk that the hydrogen will burn. There is also a problem regarding regulations that restrict the hydrogen concentration of discharged gases.

In particular, conventional technologies have a problem in that, if a power net is connected for an electrochemical hydrogen pumping (EHP) reaction, a relay is connected while being exposed to a high electric potential. This limits the operating lifespan of the relay. In addition, if the EHP reaction continues, corrosion of the carbon support included in the membrane electrode assembly (MEA) inside the fuel cell stack proceeds.

The above descriptions regarding background arts are only for helping understanding of the background of the present disclosure and should not be considered by those having ordinary skill in the art as corresponding to already-known prior arts.

SUMMARY

The present disclosure has been proposed to solve the above-mentioned problems. An aspect of the present disclosure is to provide a technology for controlling a fuel cell by using an electrochemical hydrogen pumping (EHP) reaction such that hydrogen that has crossed over toward the cathode of the fuel cell is moved backed to the anode. Thus, the amount of hydrogen discharged into the air may be reduced.

A power net system of a fuel cell according to the present disclosure may include: a fuel cell configured to generate electric power through a reaction of a fuel gas and an oxidation gas; batteries configured to be charged by the electric power generated by the fuel cell or be discharged to supply electric power; main lines electrically connecting the fuel cell and the batteries; main relays provided in the main lines and configured to open or allow electrical connections between the fuel cell and the batteries; cathod oxygen depletion (COD) lines branched from the main lines between the fuel cell and the main relays and provided with a COD device configured to consume input electric power; COD relays provided in the COD lines and configured to open or allow electrical connections to the COD device through the COD lines; and a controller configured to control the main relays or the COD relays to supply electric power charged in the batteries to the fuel cell.

The main lines may include a main positive electrode line connecting a positive electrode of the fuel cell and positive electrodes of the batteries and a main negative electrode line connecting a negative electrode of the fuel cell and negative electrodes of the batteries. The main relays may include a first main relay located in the main positive electrode line and a second main relay located in the main negative electrode line.

The COD lines may include a positive electrode COD line branched from the main positive electrode line on a side, which is close to the fuel cell with respect to the first main relay. The COD lines may also include a negative electrode COD line branched from the main negative electrode line on a side, which is close to the fuel cell with respect to the second main relay. The COD device may be connected to the positive electrode COD line and the negative electrode COD line to consume the electric power.

The power net system may further include a first COD relay provided in the positive electrode COD line or the negative electrode COD line to open or allow an electrical connection.

At least one of the main positive electrode line or the main negative electrode line may be provided with a diode that allows flows of currents only in one direction. The power net system may further include an EHP line electrically connecting the diode and the fuel cell in the main positive electrode line or the main negative electrode line and connecting the first COD relay and the COD device in the positive electrode COD line or the negative electrode COD line. The power net system may further include a second COD relay provided in the EHP line to open or allow an electrical connection.

The COD device may maintain a state in which the positive electrode COD line and the negative electrode COD line are electrically connected to each other and the consumed electric power may be controlled through switching control. The controller may vary the electric power consumed in the COD device by switching the COD device.

The main lines may include a main positive electrode line connecting a positive electrode of the fuel and positive electrodes of the batteries and a main negative electrode line connecting a negative electrode of the fuel cell and negative electrodes of the batteries. The power net system may further include a current sensor located in the main positive electrode line or the main negative electrode line on a side, which is closer to the fuel cell, and configured to sense a current that is output from the fuel cell or input to the fuel cell.

The COD lines may include a positive electrode COD line branched from the main positive electrode line on a side, which is close to the fuel cell with respect to the first main relay, and a negative electrode COD line branched from the main negative line on a side, which is close to the fuel cell with respect to the second main relay. The power net system may further include an EHP line connecting the main positive electrode line and the negative electrode COD line when the current sensor is located in the main positive electrode line, or connecting the main negative electrode line and the positive COD line when the current sensor is located in the main negative line.

A method for controlling the power net system of the fuel cell according to the present disclosure may include: stopping generation of electric power by the fuel cell; supplying the electric power stored in the batteries to the fuel cell such that a fuel of a cathode flows to an anode; and generating electric power through a reaction of the fuel gas and the oxidation gas in the fuel cell.

The method may further include performing a shutdown control of, when the generation of the electric power by the fuel cell is stopped through a start-off of the fuel cell in the stopping of generation of electric power by the fuel cell, decreasing the voltage of the fuel cell, after the generation of the electric power by the fuel cell is stopped. The performing of the shutdown control may include opening the connections between the fuel cell and the batteries by opening the main relays after the electric power is consumed by the COD device in connection states of the COD relays.

The performing of the shutdown control may include sequentially opening the main positive electrode line connecting the positive electrode of the fuel cell and the positive electrodes of the batteries and the main negative electrode line connecting the negative electrode of the fuel cell and the negative electrodes of the batteries.

The method may further include: determining whether generation of electric power by the fuel cell is required through a start-on of the fuel cell or a release of an FC stop mode of the fuel cell, before hydrogen flows from the cathode to the anode. The flowing of the hydrogen from the cathode to the anode may include supplying the electric power stored in the batteries to the fuel cell when generation of electric power by the fuel cell is required.

The flowing of the hydrogen from the cathode to the anode may include discharging the batteries by controlling a bidirectional converter located between the fuel cell and the batteries and supplying the electric power discharged from the batteries to the fuel cell via the COD lines.

The flowing of the hydrogen from the cathode to the anode may include closing the positive COD line electrically connecting a side of the main positive line connecting the positive electrode of the fuel cell and the positive electrodes of the batteries, which is close to the batteries, and the positive electrode of the COD device. The flowing of the hydrogen from the cathode to the anode may also include closing the EHP line electrically connecting a side of the main positive electrode line, which is close to the fuel cell, and the negative electrode of the COD device.

The flowing of the hydrogen from the cathode to the anode may include changing the electric power consumed in the COD device through a switching control of the COD device that maintains a state in which the positive electrode COD line and the negative electrode COD line are electrically connected to each other.

A power net system of a fuel cell and a method for controlling the same, according to the present disclosure, are advantageous in that, when a power net is connected for the purpose of an EHP reaction, a relay is prevented from being connected at a high electric potential. Thus, the operating lifespan of the relay is increased.

In addition, the EHP reaction is terminated on the basis of the cell voltage of the fuel cell such that corrosion of the carbon support included in the membrane electrode assembly inside the fuel cell stack is prevented from proceeding. This advantageously improves durability.

BRIEF DESCRIPTION OF THE DRAWINGS

The above and other aspects, features, and advantages of the present disclosure should be more apparent from the following detailed description taken in conjunction with the accompanying drawings, in which.

DETAILED DESCRIPTION OF THE EMBODIMENTS

Figure 1:
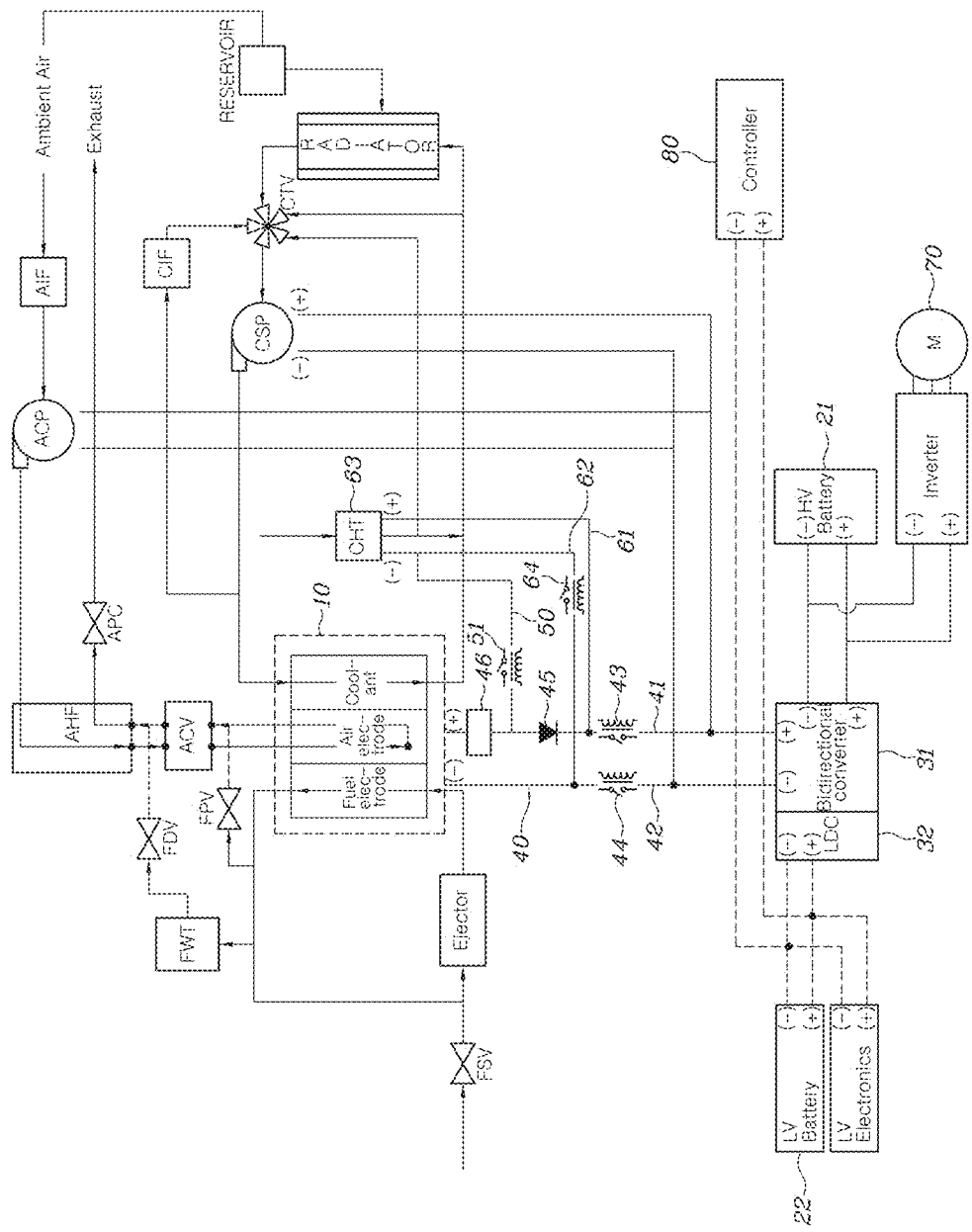
FIG. 1 is a diagram of a power net system of a fuel cell according to an embodiment of the present disclosure.

A specific structural or functional description of embodiments of the present disclosure described in the specification or application is given merely for the purpose of describing the embodiment according to the present disclosure. Therefore, the embodiments according to the present disclosure may be implemented in various forms. The present disclosure should not be construed as being limited to the embodiments described in the specification or application.

Various changes and modifications may be made to the embodiments according to the present disclosure. Particular embodiments are illustrated in the drawings and described in the specification or application. However, it should be understood that embodiments according to the concept of the present disclosure are not limited to the particular disclosed embodiments. The present disclosure includes all modifications, equivalents, and alternatives falling within the spirit and scope of the present disclosure.

Such terms as "a first a first and/or a second" may be used to described various elements, but the elements should not be limited by these terms. These terms are intended merely to distinguish one element from other elements. For example, a first element may be named a second element and similarly a second element may be named a second element without departing from the scope of protection of the present disclosure.

In the case where an element is referred to as being "connected" or "accessed" to other elements, it should be understood that not only the element is directly connected or accessed to the other elements, but also another element may exist between them. Contrarily, in the case where a component is referred to as being "directly connected" or "directly accessed" to any other component, it should be understood that there is no component therebetween. The other expressions of describing a relation between structural elements, i.e. "between" and "merely between" or "neighboring" and "directly neighboring", should be interpreted similarly to the above description.

The terms used in the present disclosure are merely used to describe specific embodiments and are not intended to limit the present disclosure. A singular expression may include a plural expression unless they are definitely different when taken in context. As used herein, the expressions "include" or "have" are intended to specify the existence of mentioned features, numbers, steps, operations, elements, components, or combinations thereof. These expressions should be construed as not precluding the possible existence or addition of one or more other features, numbers, steps, operations, elements, components, or combinations thereof.

Unless defined otherwise, all terms used herein, including technical and scientific terms, have the same meaning as those commonly understood by a person having ordinary skill in the art to which the present disclosure pertains. Such terms as those defined in a generally used dictionary may be interpreted to have the meanings equal to the contextual meanings in the relevant field of art. Such terms should not be interpreted to have ideal or excessively formal meanings unless clearly defined in the present disclosure.

Hereinafter, in order to describe the present disclosure in detail, embodiments of the present disclosure are described with reference to the accompanying drawings. The same reference numerals suggested in the drawings denote the same or equivalent members. When a component, device, element, or the like of the present disclosure is described as having a purpose or performing an operation, function, or the like, the component, device, or element should be considered herein as being "configured to" meet that purpose or to perform that operation or function.

FIG. 1 is a diagram of a power net system of a fuel cell 10 according to an embodiment of the present disclosure.

Referring to FIG. 1, a power net system of a fuel cell 10 according to an embodiment of the present disclosure includes a fuel cell 10 configured to generate electric power through a reaction of a fuel gas and an oxidation gas. The system also includes batteries 21 and 22 charged by the electric power generated by the fuel cell 10 or discharged to supply electric power. The system also includes main lines 40 electrically connecting the fuel cell 10 and the batteries 21 and 22. The system also includes main relays 43 and 44 opening or allowing electrical connections between the fuel cell 10 and the batteries 21 and 22. The system also includes cathod oxygen depletion (COD) lines 61 and 62 branched from the main lines 40 between the fuel cell and the main relays 43 and 44 and configured to consume input electric power. The system also includes COD relays 64 and 51 provided in the COD lines 61 and 62 and configured to open or allow electrical connections to a COD device 63 through the COD lines 61 and 62. The system also includes a controller 80 configured to control the main relays 43 and 44 or the COD relays 64 and 51 to supply the electric power charged in the batteries 21 and 22 to the fuel cell 10. The power net system includes FSV (fuel supply valve), FWT (fuel-line water trap), FDV (fuel-line drain valve), FPV (fuel-line purge valve), ACV (air cut-off valve), AHF (air humidifier), APC (air pressure controller), ACP (air compressor), AIF (air intake filter), CIF (coolant ion filter), CSP (coolant stack pump), CTV (coolant temperature-control valve), CHT (coolant bypass valve), M (motor).

The fuel cell 10 generates electric power through a chemical reaction of hydrogen and oxygen. In detail, driving energy of a fuel cell (10) electric vehicle (FCEV) that is driven by a motor employs a polymer electrolyte fuel cell (PEFC) 10.

The PEFC 10 is used in the form of a fuel cell stack 10 that is obtained by assembling a structure, in which several tens to hundreds of repeatedly stacked unit cells are assembled by using a clamping device for maintaining a proper coupling pressure. Each cell includes a membrane electrode assembly (MEA), in which electrodes are attached to opposite sides of a membrane with respect to a polymer electrolyte membrane, through which protons ($H^+$) flow. Main components of the electrodes are catalyst layers for electrochemical reactions. Each cell also includes a gas diffusion layer (GDL) that functions to uniformly distribute reaction gases. Each cell also includes a bipolar plate (BP) including a passage, through which the reaction gases and coolant flow. Each cell also includes a gasket for securing air-tightness of the reaction gases and the coolant.

In an embodiment, a pair of electrodes are disposed in the membrane electrode assembly (MEA. In the MEA, an electrochemical reaction directly occurs, while the polymer electrolyte membrane is disposed therebetween. Hydrogen that is the fuel gas is supplied to a hydrogen electrode (anode) that occupies a predetermined volume in the interior of the fuel cell stack 10. The air containing oxygen that is the oxidation gas is supplied to an air electrode (cathode).

The hydrogen supplied to the hydrogen electrode is discomposed to protons ($H^+$) and electrons ($e^-$) by the catalyst in the hydrogen electrode attached to one surface of the polymer electrolyte membrane. Only the protons selectively pass through the polymer electrolyte membrane that is a cation exchange membrane and flow to the air electrode attached to an opposite surface of the polymer electrolyte membrane. The electrons are delivered to the air electrode through an external wire. The chemical reaction in the interior of the fuel cell 10 is represented in the following reaction formula.

$$H_2 \rightarrow 2H^+ + 2e^- \qquad \text{[Reaction in Hydrogen Electrode]}$$

$$\tfrac{1}{2}*O_2(g) + 2H^+ + 2e^- \rightarrow H_2O(l) \qquad \text{[Reaction in Air Electrode]}$$

$$H_2(g) + \tfrac{1}{2}*O_2(g) \rightarrow H_2O(l) + \text{electric energy} + \text{thermal energy} \qquad \text{[Whole reaction]}$$

The fuel cell 10 may be connected to a driving system 70 such as a motor, a high-voltage battery 21, and balance-of-plants BOPs, through the main lines 40. The voltages of the main lines 40 may be maintained at the same voltage as the output voltage of the fuel cell 10 in a state in which the main lines 40 are connected to the fuel cell 10.

The main relays 43 and 44 are provided in the main lines 40 to open or allow electrical connections between the fuel cell 10 and the batteries 21 and 22. In an embodiment, the main relays 43 and 44 are located between the driving system 70, the high-voltage battery 21, and the balance-of-plants connected to the main lines 40 of the fuel cell 10 to separate the fuel cell 10 from the main lines 40 when the electrical connections are opened.

Further, the fuel cell 10 may be connected to the rechargeable batteries 21 and 22. The batteries 21 and 22 may supply electric power to the outside while being charged by the generated electric power of the fuel cell 10 or discharging the charged electric power. Here, the batteries 21 and 22 may be batteries or super-capacitors. In an embodiment, the batteries 21 and 22 may be a high-voltage (HV) battery 21 or a low-voltage (LV) battery 22.

In an embodiment, the rechargeable high-voltage (HV) battery 21 may be further provided with a bidirectional high-voltage DC-DC converter (BHDC) 31 between the high-voltage (HV) battery 21 and the fuel cell stack 10.

In addition, the present disclosure includes a fuel processing line (FPL) configured to supply hydrogen that is the fuel to the fuel cell stack 10 and discharge the hydrogen. The present disclosure also includes an air processing line (APS) configured to supply air containing oxygen that is an oxidation agent to the fuel cell stack 10 and discharge the oxygen. The present disclosure also includes a thermal management line (TML) configured to perform a function of managing water in the interior of the polymer electrolyte fuel cell 10 by removing heat that is a reactant side-product of the fuel cell 10 of the fuel cell stack 10 to the outside of the fuel cell (10) system and adjusting the operation temperature of the fuel cell stack 10. The present disclosure also includes balance-of-plants BOPs constituting the fuel processing line, the air processing line, and the thermal management line.

The balance-of-plants BOPs of the fuel cell (10) system include a coolant stack pump (CSP), an air compressor (ACP), and a coolant heater (CHT) that are connected from the fuel cell stack 10 or the high-voltage battery 21 to the main lines 40 via the bidirectional converter 31 and are operated by a high-voltage source.

In addition, low-voltage power devices (LV electronics) operated by a low-voltage source may be connected to a low-voltage (LV) line connecting the low-voltage (LV) battery 22 for normally operating the low-voltage power devices and operating the controller 80 and a low-voltage DC-DC converter (LDC) 32. The LDC 32 is provided between the low-voltage battery 22 and the bidirectional converter 31 and connected to the low-voltage battery 22.

The hydrogen that is a fuel supplied from a hydrogen storage device is mixed with a post-reaction fuel gas containing non-reaction hydrogen, except for the followings. The exceptions include hydrogen consumed after participating in the reaction of the fuel cell 10. The reaction is in the hydrogen electrode of the fuel cell stack 10 from the fuel processing line through a fuel recirculation device such as an ejector. The exceptions also include moisture obtained after the moisture generated in the air electrode of the stack through the reaction of the fuel cell 10 passes through the polymer electrolyte membrane and is diffused to the hydrogen electrode. The exceptions also include nitrogen obtained after, among the air mainly containing oxygen and nitrogen supplied to the air electrode of the stack through the air compressor, nitrogen that does not participate in the reaction of the fuel cell 10 and resides in the air electrode passes through the polymer electrolyte membrane, is diffused from the air electrode to the hydrogen electrode, and is supplied to the hydrogen electrode of the fuel cell stack 10.

When the moisture in the fuel processing line is condensed as water droplets in a process of the fuel gas being circulated by a fuel recirculating device such as an ejector, the moisture is collected as liquid-state water by a water trap FWT. As the closed state of a drain valve FDV connected to the water trap is changed to an opened state for a predetermined period of time if the amount of the liquid-state water is a predetermined value or more, the water is discharged through the air processing line and is removed from the fuel processing line.

The purge valve FPV is maintained in a closed state while the fuel cell 10 is operated in a normal state. The concentration of hydrogen in the hydrogen electrode gradually decreases as the amount of hydrogen consumed through the reaction of the fuel cell 10 increases. When the concentration of the hydrogen in the hydrogen electrode is lowered to a predetermined level or less, the voltage of an output terminal of the fuel cell stack 10 may become lower. This voltage is lower than a voltage of the output terminal of the fuel cell stack 10 when the concentration of the hydrogen in the hydrogen electrode is at a predetermined level or more in the same load condition. In this case, it is necessary to introduce new hydrogen into the hydrogen electrode of the fuel cell stack 10 to maintain the concentration of the hydrogen in the hydrogen electrode at a predetermined level or more.

To achieve this, the closed state of the purge valve FPV is changed to an opened state for a predetermined period of time, a portion of the post-reaction fuel gas in the hydrogen electrode of the fuel cell stack 10 is discharged to the air processing line and is removed from the fuel processing line. New hydrogen corresponding to the volume of the discharged post-reaction fuel gas is introduced into the hydrogen electrode of the fuel cell stack 10.

A portion of the post-reaction fuel gas discharged to the air processing line is mixed with, among the air supplied to the air electrode, oxygen and nitrogen after a reaction, except for the followings. The exceptions may include oxygen that has participated in the reaction of the fuel cell 10. The exception may also include air after the reaction. The air contains moisture that is a reaction side-product of the fuel cell 10 by the air compressor and is discharged to the outside.

In this way, an excessive amount of air is supplied by the air compressor such that the concentration of the hydrogen in the gas discharged to the outside does not threaten safety. Further, the present disclosure uses a method of preventing the concentration of the hydrogen in the gas discharged to the outside from threating safety even when a portion of the post-reaction fuel gas discharged to the air processing line is added. The portion of the post-reaction fuel gas is added by reducing a period of time, for which the purge valve FPV is maintained in an opened state in proportion to the amount of air supplied by an air supplier.

In an embodiment, the concentration of the hydrogen corresponding to the level that threatens safety is drawn up by rules. For example, the concentration of the hydrogen drawn up by the rules may be determined to be a maximum of 8% and 3 seconds and an average of 4% or less.

Introduction of air is stopped because the operation of the air compressor is stopped in a stop state, in which a normal operation of generating electric power by the fuel cell 10 is ended and the voltage of the stack decreases to a ground voltage level in a state, in which an air cut-off valve ACV, a drain valve FDV, and a purge valve FPV are closed. Thus, a small amount of non-reaction oxygen, nitrogen, and water residue in the air electrode. Additionally, after the air cut-off valve ACV is opened, a hydrogen supply valve that supplies hydrogen to the hydrogen processing line may be opened.

In a preservation state, in which the stop state continues, the hydrogen electrode and the air electrode of the stack are preserved to be electrically connected to each other through the COD resistor 63. By such a structure, the small amount of non-reaction oxygen that is present in the air electrode is completely removed. Among the reaction gas that is present in the hydrogen electrode, hydrogen is diffused to the air electrode through a crossover through the polymer electrolyte membrane and the state becomes closes to the equilibrium state as the preservation period of time becomes longer.

In a restart process for making a normal operation state such that the fuel cell 10 generates electric power again, the air cut-off valve ACV is opened and the air compressor is operated such that air starts to be supplied to the air electrode of the fuel cell stack 10. By such a structure, a section, in which a small amount of hydrogen residing in the air electrode in the stack and oxygen in the air supplied through the air compressor coexist, is generated in a process of increasing the voltage of the fuel stack while the hydrogen diffused to the air electrode is discharged to the outside due to a crossover through the polymer electrolyte membrane in the preservation state. The duration time in the section becomes shorter as the amount of air supplied to the air electrode in the stack through the air compressor becomes larger.

An FC stop mode corresponds to an idle state, in which the generation of electric power by the fuel cell 10 is temporarily stopped in the start-on state and the operation of the air compressor is stopped before the vehicle that is stopped is restarted by an accelerator signal. However, the air cut-off valve ACV is in an opened state stands by in a state, in which a stack voltage of a predetermined level is secured, for a rapid response of the fuel cell (10) system when the vehicle starts to travel again.

In an embodiment, the FC stop mode may be started when the travel speed of the vehicle is a predetermined speed or less or the state of charge (SOC) of the high-voltage battery 21 is a preset SOC or more while the required electric power of the fuel cell 10 is a preset electric power or less.

Also in the FC stop mode, the concentration of the hydrogen in the air electrode increases due to a hydrogen crossover phenomenon, in which the hydrogen in the hydrogen electrode is diffused to the air electrode through the polymer electrolyte membrane. In an embodiment, in order to discharge the hydrogen in the air electrode to the outside to prevent a safety problem, an operation of removing the hydrogen in the air electrode to the outside of the stack by operating the air compressor at a predetermined cycle is repeated.

The reaction gases for the air electrode and the hydrogen electrode, which occupy a predetermined volume in the interior of the fuel cell stack 10 for a vehicle, are discharged by opening and closing the air cut-off valve ACV, the drain valve FDV, and the purge valve FPV.

The concentration of the hydrogen in the gas discharged to the outside when the fuel cell 10 is operated again after the generation of the electric power or the stop of the fuel cell 10 may satisfy a normal range in the normal state of the fuel cell 10. However, if a problem of deteriorating or tearing a portion of the polymer electrolyte membrane included in the fuel cell 10 occurs as the fuel cell 10 is used for a long time, the amount of the hydrogen that crosses over to the air electrode significantly increases. Thus, the concentration of the hydrogen in the gas discharged to the outside when the fuel cell 10 is started again or the FC stop mode is released increases to a level that threatens safety.

In order to solve the problem, the controller 80 may control the main relays 43 and 44 or a bypass relay to supply the electric power charged in the batteries 21 and 22 to the fuel cell 10 in a state in which the generation of the electric power by the fuel cell 10 is stopped.

A controller 80 according to an embodiment of the present disclosure may be implemented by an algorithm configured to control operations of various elements of the vehicle, a nonvolatile memory (not illustrated) configured to store data on a software instruction for reproducing the algorithm, and a processor (not illustrated) configured to perform an operation, which are described below, by using the data stored in the memory. Here, the memory and the processor may be implemented by individual chips. In another embodiment, the memory and the processor may be implemented by an integrated single chip. The processor may take the form of one or more processors.

The COD lines 61 and 62 may be provided with the COD device 63. In an embodiment, the COD device 63 may be provided between the COD lines 61 and 62 while ends of the COD lines 61 and 62 are connected to a main positive electrode line 41 and a main negative electrode line 42, respectively.

The COD device 63 may be a simple resistor in an embodiment and as described below, may be provided with a switching unit, such as an insulated gate bipolar transistor (IGBT) such that power consumption is controlled through a switching control.

The controller 80 may perform a control to supply the electric power generated by the fuel cell 10 to the motor, the batteries 21 and 22, or auxiliary devices or supply the electric power of the batteries 21 and 22 to the fuel cell 10 through control of the main relays 43 and 44 and the COD relays 64 and 51.

Figure 2:
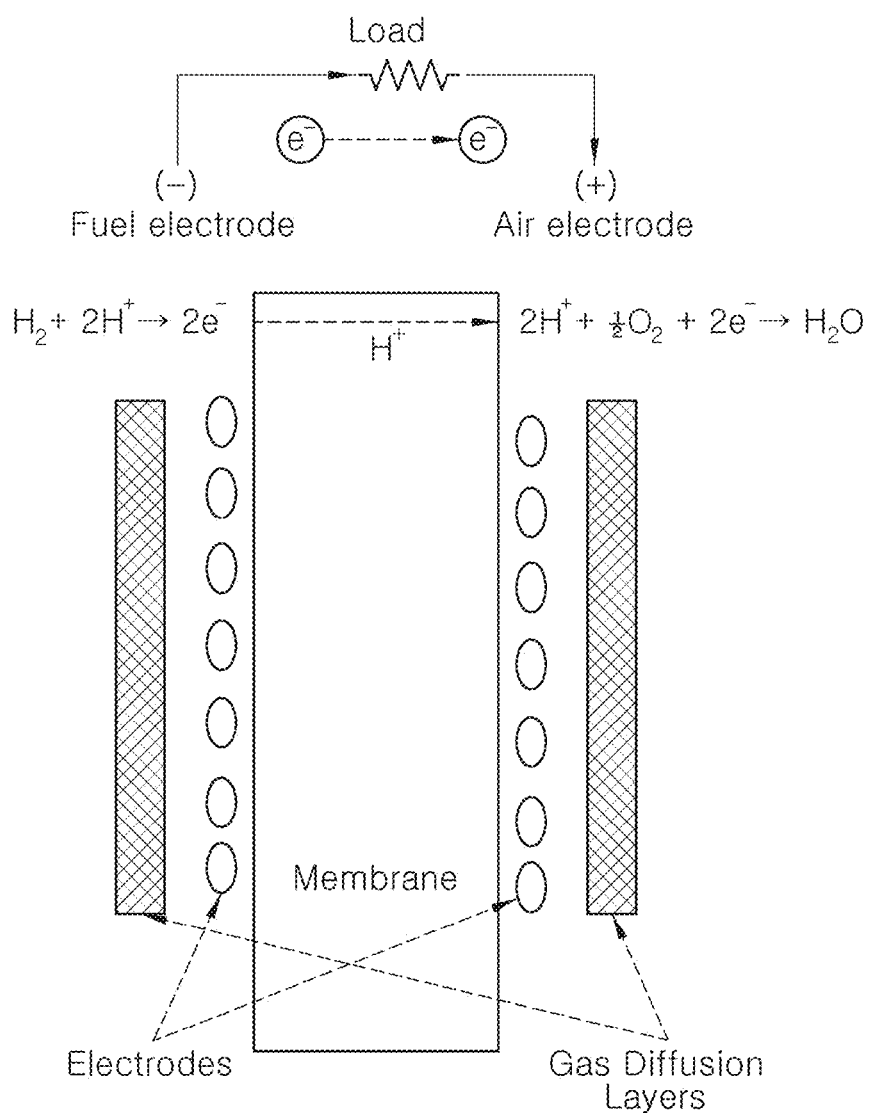
FIGS. 2 and 3 illustrate power generation and a hydrogen flow reaction of a fuel cell according to the embodiment of the present disclosure.
Figure 3:
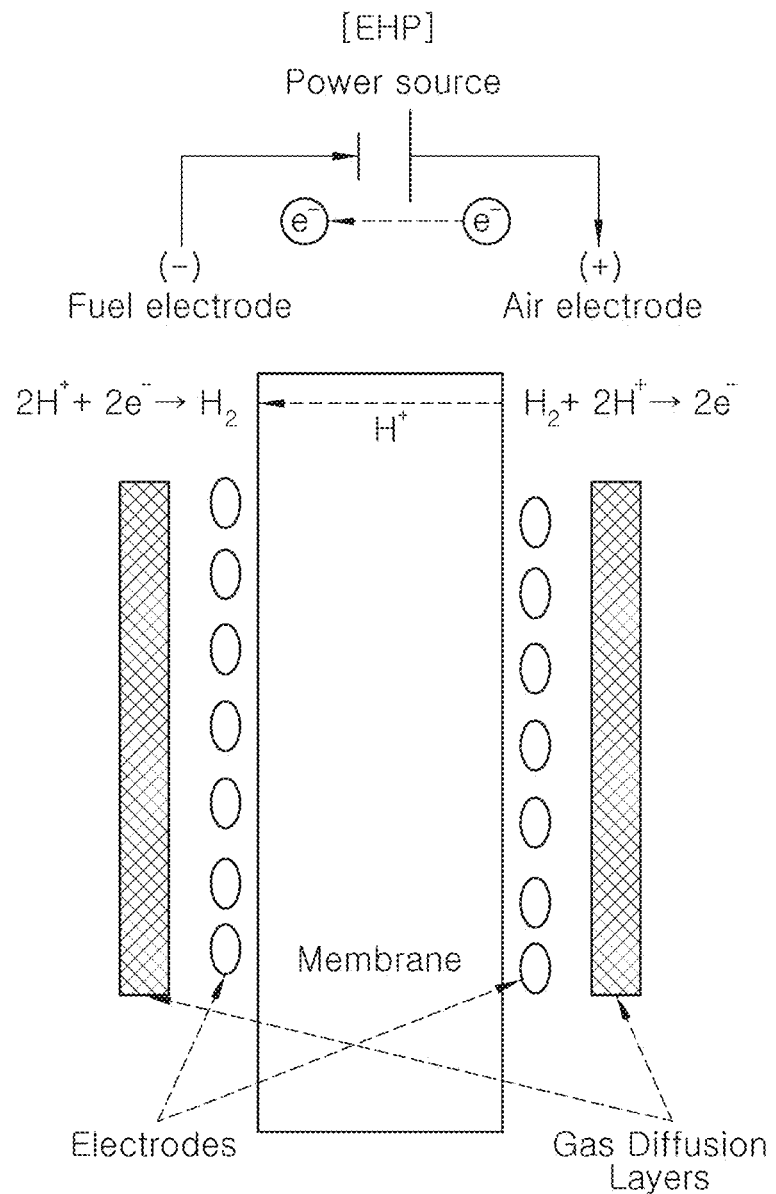

FIGS. 2 and 3 illustrate power generation and a hydrogen flow reaction of a fuel cell 10 according to the embodiment of the present disclosure.

Referring to FIGS. 2 and 3, if a voltage difference occurs due to the energy supplied from the outside to the fuel cell 10, a potential is generated in the fuel cell 10 so that the protons ($H^+$) are generated while the hydrogen is oxidized flow after passing through the polymer electrolyte membrane and are recombined to new hydrogen molecules. This reaction is called an electrochemical hydrogen pumping (EHP) reaction.

In detail, the fuel cell 10 is a kind of a galvanic cell, in which a voltage difference occurs due to a voluntary reaction of an oxidation/reduction reaction so that electric currents may flow and a positive electrode (a (+) electrode) or a negative electrode (a (−) electrode) may electrically alternately appear in the hydrogen electrode and the air electrode.

There is no change in the electrical polarities of the hydrogen electrode and the air electrode of the polymer electrolyte fuel cell 10 in the EHP reaction that consumes electric power due to a power source illustrated in FIG. 3 as well as in the reaction of the fuel cell 10 of FIG. 2 that generates electric power.

In other words, the polarities of the electric components connected to the fuel cell 10 change in neither the fuel cell (10) reaction nor the EHP reaction and the components of the power net system of the fuel cell 10 may be directly used.

However, regarding the flow directions of currents, between the fuel cell stack 10, and the bidirectional converter 31 and the inverter, the flow directions of currents with respect to the fuel cell stack 10 become opposite in such a similar way in which the flow directions of currents in the power generation of producing electric power and in the EHP that consumes electric power during charging and discharging electric power to and from the high-voltage battery 21 become opposite.

The polarities do not change even though the flow directions of currents become opposite in that the fuel cell stack 10 functions as a power source during the generation of electric power and functions as a resistor by using a separate power source in the case of the EHP.

In addition, the amount of current decreases after reaching the maximum value in a situation, in which moisture is not supplied from the outside of the fuel cell stack 10 due to the characteristics of the polymer electrolyte fuel cell 10, in which the flows of the protons (H⁺) are influenced by the amount and the distribution of moisture in the electrolyte membrane.

Figure 4:
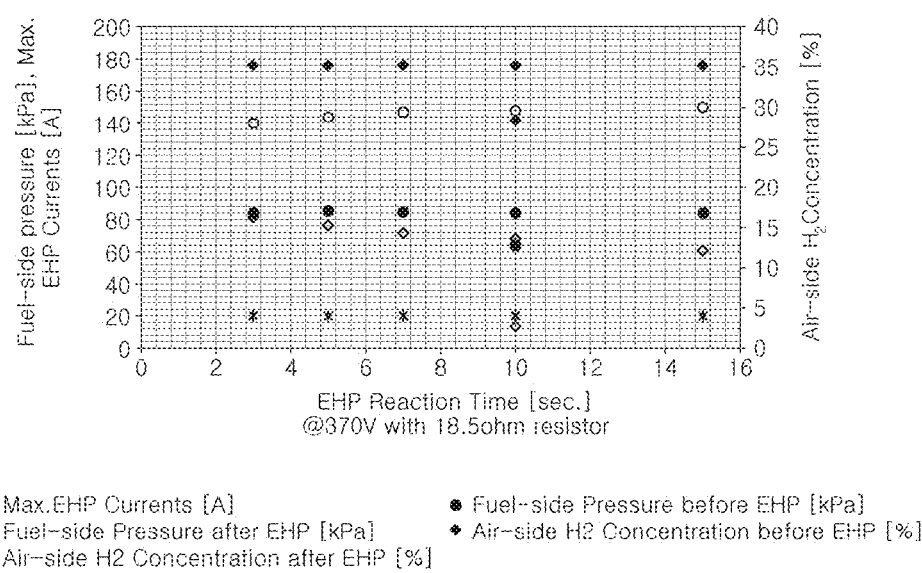
FIG. 4 illustrates states of an air electrode and a hydrogen electrode according to the hydrogen flow reaction of the fuel cell according to the embodiment of the present disclosure.

FIG. 4 illustrates states of an air electrode and a hydrogen electrode according to the hydrogen flow reaction of the fuel cell 10 according to the embodiment of the present disclosure.

Referring further to FIG. 4, the concentration of hydrogen in the air electrode significantly decreases after the EHP control is performed in a state in which the generation of the electric power by the fuel cell 10 is stopped. In an embodiment, the experimental condition corresponds to a condition in which a voltage of 370 [V] is applied to the fuel cell 10 by the high-voltage battery 21. It can be identified that the concentration of the air electrode decreases by a half of the original concentration or more even though the EHP control continues only for three seconds.

In addition, it can be identified that the pressure of the hydrogen electrode increases after the EHP control as compared with before the EHP control. Accordingly, it can be identified that the hydrogen in the air electrode flows to the hydrogen electrode. In an embodiment, because the hydrogen that is to be discharged is retrieved accordingly, fuel efficiency also may be improved.

In more detail, referring to FIG. 1 again, the main lines 40 may include a main positive electrode line 41 connecting the positive electrode of the fuel cell 10 and the positive electrodes of the batteries 21 and 22. The main lines 40 may also include a main negative electrode line 42 connecting the negative electrode of the fuel cell 10 and the negative electrodes of the batteries 21 and 22. The main relays 43 and 44 may include a first main relay 43 located in the main positive electrode line 41 and a second main relay 44 located in the main negative electrode line 42.

The main positive electrode line 41 may connect the positive electrode of the fuel cell 10 and the positive electrodes (in an embodiment, the positive electrode of the bidirectional converter 31) of the batteries 21 and 22, and the main negative electrode line 42 may connect the negative electrode of the fuel cell 10 and the negative electrodes (in an embodiment, the negative electrode of the bidirectional converter 31) of the batteries 21 and 22.

The first main relay 43 may be located in the main positive electrode line 41, the second main relay 44 may be located in the main negative electrode line 42, and the first main relay 43 and the second main relay 44 may allow or open connections of the main positive electrode line 41 and the main negative electrode line 42, respectively.

The COD lines 61 and 62 may include a positive electrode COD line 61 branched from the main positive electrode line 41 on a side, which is close to the fuel cell 10, with respect to the first main relay 43, and a negative electrode COD line 62 branched from the main negative electrode line 42 on a side, which is close to the fuel cell 10, with respect to the second main relay 44. The COD device 63 may be connected to the positive electrode COD line 61 and the negative electrode COD line 62 and may consume electric power.

The COD device 63 may be connected to a coolant heater (CHT) and may be immersed in the coolant that cools the fuel cell 10. The COD device 63 may emit heat as the electric power is consumed and may be cooled through circulation or flows of the coolant. The COD device 63 has a configuration of consuming the electric power of the fuel cell 10 to promptly decrease the voltage of the fuel cell 10.

The COD device 63 may promptly decrease the voltage of the fuel cell 10 by consuming the electric power of the fuel cell 10 even though both of the first main relay 43 and the second main relay 44 are opened.

In other words, the COD device 63 is connected to the positive electrode COD line 61 and the negative electrode COD line 62 and may be connected to the main positive electrode line 41 and the main negative electrode line 42 through the positive electrode COD line 61 and the negative electrode COD line 62. In an embodiment, the positive electrode COD line 61 and the negative electrode COD line 62 may be branched from the main positive electrode line 41 and the main negative electrode line 42, on sides, which are close to the fuel cell, with respect to the first main relay 43 and the second main relay 44, respectively. Accordingly, in a state in which the first main relay 43 and the second main relay 44 are opened, the electric power of the fuel cell 10 may be consumed by the COD device 63 through the main positive electrode line 41 and the main negative electrode line 42.

A first COD relay 64 that is provided in the positive electrode COD line 61 or the negative electrode COD line 62 to open or allow an electrical connection may be further included.

The first COD relay 64 may be located in any one of the positive electrode COD line 61 or the negative electrode COD line 62 and may allow or open electrical connections of the COD lines 61 and 62.

In more detail, at least one of the main positive electrode line 41 or the main negative electrode line 42 may further include an EHP line 50 provided with a diode 45 that allows flows of currents only in one direction. The diode 45 and the fuel cell 10 are electrically connected in the main positive electrode line 41 or the main negative electrode line 42. The EHP line 50 may also be provided with the first COD relay 64 and the COD device 63 in the positive electrode COD line 61 or the negative electrode COD line 62. At least one of the main positive electrode line 41 or the main negative electrode line 42 may further include a second COD relay 51 that is provided in the EHP line 50 to open or allow an electrical connection.

As an embodiment, the diode 45 may be provided in the main positive electrode line 41. The EHP line 50 may be branched from the main positive electrode line 41 between the fuel cell 10 and the diode 45 to be connected to the negative electrode COD line 62 between the first COD relay 64 and the COD device 63. In other words, the EHP line 50 may be connected to the negative electrode of the COD device 63 and the positive electrode of the fuel cell 10.

Further, a second COD relay 51 may be provided in the EHP line 50 to allow or open an electrical connection of the EHP line 50.

In an embodiment, the first COD relay 64 and the second COD relay 51 may be connected or opened to the contrary. The electric power of the fuel cell 10 may be consumed in the COD device 63 in the connection state of the first COD relay 64 and the electric power discharged from the batteries 21 and 22 may be supplied to the fuel cell 10 in the connection state of the second COD relay 51.

In other words, the EHP line 50 connected to the negative electrode of the COD device 63 may be connected to the main positive electrode line 41, differently from the negative electrode COD line 62 connected to the main negative electrode line 42.

The COD device 63 may maintain a state, in which the positive electrode COD line 61 and the negative electrode COD line 62 are electrically connected to each other, the consumed electric power may be controlled through a switching control, and the controller 80 may change the electric power consumed in the COD device 63 through a switching control of the COD device 63.

In detail, the COD device 63 may change the consumed electric power by adjusting the number of times of periodic repetitions and the period of time of the connection through an on/off switching control by the controller 80. In addition, a resistor, through which fine currents flow, may be embedded in the COD device 63 so that fine current may flow even in an off state.

A current sensor 46 that is located in the main positive electrode line 41 or the main negative electrode line 42, on a side that is close to the fuel cell 10, to sense a current output from the fuel cell 10 or input to the fuel cell 10 may be further included.

In detail, the current sensor 46 may sense an output current of the fuel cell 10 in a power generation state of the fuel cell 10. In addition, the current sensor 46 may sense a current input to the fuel cell 10 in an EHP reaction state of the fuel cell 10.

The COD lines 61 and 62 may include a positive electrode COD line 61 branched from the main positive electrode line 41 on a side that is close to the fuel cell 10 with respect to the first main relay 43. The COD lines 61 and 62 may also include a negative electrode COD line 62 branched from the main negative electrode line 42 on a side that is close to the fuel cell 10 with respect to the second main relay 44. An EHP line 50 may be further included. The EHP line 50 connects the main positive electrode line 41 and the negative electrode COD line 62 when the current sensor 46 is located in the main positive electrode line 41. In another embodiment, the EHP line 50 connects the main negative electrode line 42 and the positive electrode COD line 61 when the current sensor 46 is located in the main negative electrode line 42.

In other words, the EHP line 50 may connect the main positive electrode line 41 and the negative electrode COD line 62 when the current sensor 46 is located in the main positive electrode line 41. To the contrary, the EHP line 50 may connect the main negative electrode line 42 and the positive electrode COD line 61 when the current sensor 46 is located in the main negative electrode line 42.

Accordingly, the current sensor 46 may sense the current input to the fuel cell 10 through the EHP line 50 at the same time.

Figure 5:
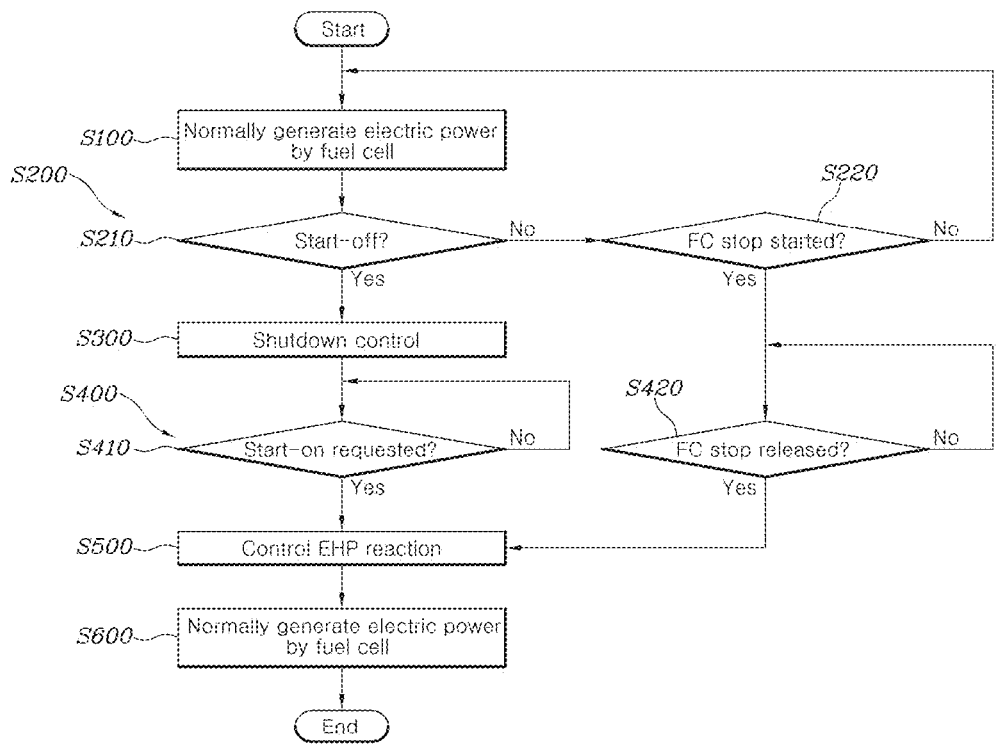
FIG. 5 is a flowchart of a method for controlling a power net system of a fuel cell according to an embodiment of the present disclosure.

FIG. 5 is a flowchart of a method for controlling a power net system of a fuel cell 10 according to an embodiment of the present disclosure.

Referring further to FIG. 5, a method for controlling a power net system of a fuel cell 10 according to an embodiment of the present disclosure includes: an operation S200 of stopping generation of electric power by the fuel cell 10; supplying the electric power stored in the batteries 21 and 22 to the fuel cell 10 and moving a fuel of a cathode to an anode (S500); and generating electric power through a reaction of the fuel gas and the oxidation gas in the fuel cell 10 (S600).

Before the operation S200 of stopping the generation of electric power by the fuel cell 10, electric power is normally generated by the fuel cell 10 (S100) and the electric power generated by the fuel cell 10 may be supplied to the batteries 21 and 22, the driving device, the auxiliary devices, or the like through the main lines 40.

In an embodiment, in the states (S100 and S600), in which the fuel cell 10 normally generates electric power, the fuel gas and the oxidation gas may be supplied to the fuel cell 10 to generate electric power, in a state in which the power network is constituted while the first main relay 43 and the second main relay 44 are closed, the second COD relay 51 is opened, and the first COD relay 64 is closed.

Here, the voltage of the fuel cell 10 and the voltage of the bidirectional converter 31 may be in high-voltage states. Further, the COD device 63 may not consume or minimally consume the electric power generated by the fuel cell 10 while the switching control is off.

The method may further include an operation (S300) of performing a shutdown control of, when the generation of the electric power by the fuel cell 10 is stopped through a start-off of the fuel cell 10 (S210) in the operation (S200) of stopping generation of electric power by the fuel cell 10, decreasing the voltage of the fuel cell 10, after the generation of the electric power by the fuel cell 10 is stopped (S200). In the operation (S300) of performing of the shutdown control, the connection between the fuel cell 10 and the batteries 21 and 22 may be opened by opening the main relays 43 and 44 after the electric power is consumed by the COD device 63 in a connection state of the COD relays 64 and 51.

In the operation (S300) of performing a shutdown control, in the state in which the power network that is the same as the state, in which the fuel cell 10 normally generates electric power, is constituted, the first main relay 43 and the second main relay 44 may be closed, the second COD relay 51 may be opened, and the first COD relay 64 may be closed.

However, in the operation (S300) of performing a shutdown control, the supply of the oxidation gas may be stopped, and the voltage of the fuel cell 10 may decrease from a high voltage to a low voltage. In an embodiment, the controller 80 may decrease the voltage of the fuel cell 10 by consuming the electric power of the fuel cell 10 while the switching control of the COD device 63 is on.

Further, in the operation (S300) of performing a shutdown control, the connections between the fuel cell 10 and the batteries 21 and 22 may be opened by opening the main relays 43 and 44 in a state, in which the output voltage of the fuel cell 10 decreases after the electric power is consumed in the COD device 63.

In an embodiment, in the operation (S300) of performing a shutdown control, the main positive electrode line 41 connecting the positive electrode of the fuel cell 10 and the positive electrodes of the batteries 21 and 22 and the main negative electrode line 42 connecting the negative electrode of the fuel cell 10 and the negative electrodes of the batteries 21 and 22 may be sequentially opened.

In other words, the first main relay 43 and the second main relay 44 may be controlled to be sequentially opened so that the main negative electrode line 42 is opened after the main positive electrode line 41 is opened.

Additionally, after the operation (S300) of performing a shutdown control, the electric power may be stored in a state, in which the generation of the electric power by the fuel cell 10 is stopped. In the storage state, the first main relay 43 and the second main relay 44 may be opened, the first COD relay 64 may be closed, and the second COD relay 51 may be opened.

As another embodiment, in the operation S200 of stopping the generation of electric power by the fuel cell 10, the generation of the electric power by the fuel cell 10 may be controlled to an FC stop mode (S220). In this case, the shutdown control may be omitted and the supply of the oxidation gas may be stopped.

In addition, the first main relay 43 and the second main relay 44 may be closed in the FC stop mode, the first COD relay 64 may be closed, and the second COD relay 51 may be opened.

The method may further include an operation (S400) of determining whether generation of electric power by the fuel cell 10 is required through a start-on (S410) of the fuel cell 10 or a release (S420) of an FC stop mode, before the operation (S500) of hydrogen flowing from the cathode to the anode. In the operation (S500) of the hydrogen flowing from the cathode to the anode, the electric power stored in the batteries 21 and 22 may be supplied to the fuel cell 10 when generation of electric power by the fuel cell 10 is required.

In other words, it may be determined whether generation of electric power by the fuel cell 10 is required in a state, in which the generation of electric power by the fuel cell 10 is stopped, the electric power stored in the batteries 21 and 22 may be supplied to the fuel cell 10 when generation of electric power by the fuel cell 10 is required, and electric power may be generated by the fuel cell 10 thereafter.

As another embodiment, in the operation (S500) of the hydrogen of the cathode flowing to the anode, the hydrogen of the cathode may be controlled to flow to the anode according to a preset cycle. Before the operation (S500) of the hydrogen of the cathode flowing to the anode, a time point, at which the electric power stored in the batteries 21 and 22 is supplied to the fuel cell 10, may be determined according to the preset cycle.

In the operation (S500) of the hydrogen of the cathode flowing to the anode, the batteries 21 and 22 may be discharged by controlling the bidirectional converter 31 located between the fuel cell 10 and the batteries 21 and 22 and the electric power discharged from the batteries 21 and 22 may be supplied to the fuel cell 10 the COD lines 61 and 62.

In more detail, after the controller 80 is switched on by the low-voltage battery 22 and the state of the bidirectional converter 31 is converted to a low voltage state, in which the relays may be operated in a ground voltage state, the second COD relay 51 may be closed and the first COD relay 64 may be opened. Thereafter, a preparation for an EHP reaction may be finished by closing the second main relay 44 to allow the voltage between the fuel cell 10 and the BHDC to have the same base voltage and closing the first main relay 43 to constitute a circuit (the power network).

Here, because the fuel cell 10 and the bidirectional converter 31 are in a state, in which an electrical connection is maintained through a resistor, which is embedded in the COD device 63 and through which fine current may flow, the voltage of the fuel cell 10 may increase from a ground voltage state to a low voltage state.

Further, in the operation (S500) of the hydrogen of the cathode flowing to the anode, the positive electrode COD line 61 that electrically connects sides of the main positive electrode line 41 connecting the positive electrode of the fuel cell 10 and the positive electrodes of the batteries 21 and 22, which are close to the batteries 21 and 22, and the positive electrode of the COD device 63 may be closed. In the operation (S500) of the hydrogen of the cathode flowing to the anode, the EHP line 50 that electrically connects a side of the main positive electrode line 41, which is close to the fuel cell 10, and the negative electrode of the COD device 63 may be closed.

In addition, in the operation (S500) of the hydrogen of the cathode flowing to the anode, the electric power consumed in the COD device 63 may be changed through a switching control of the COD device 63 that maintains the state, in which the positive electrode COD line 61 and the negative electrode COD line 62 are electrically connected to each other.

The controller 80 may be started by the electric power supplied from the batteries 21 and 22 to the fuel cell 10 via the bidirectional converter 31 by switching on a switching element of the COD device 63. If the voltage of the bidirectional converter 31 increases from a low voltage to a high voltage after a circuit is constituted first, the voltage applied to the fuel cell 10 also increases, and the EHP reaction may be finished within several seconds.

In the operation (S600) of generating electric power, electric power may be generated by the fuel cell 10 by supplying the hydrogen gas and the oxidation gas to the fuel cell 10 after the hydrogen of the cathode flows to the anode in the operation of the hydrogen of the cathode flowing to the anode.

The controller 80 may give a command of switching off the COD device 63 to finish the EHP reaction. In an embodiment, when the hydrogen of the cathode of the fuel cell 10 flows to the anode so that a change rate of a physical property (a stack current as another example), such as an increase of the pressure of the anode, over time gradually decreases to a preset value or less, the EHP reaction may be finished.

In detail, when the fuel cell 10 is exposed such that the cell voltage thereof is 0.8 [V] or more, the carbon corrosion of the fuel cell 10 is accelerated so that a carbon support may be corroded by the following reaction.

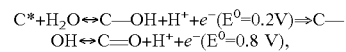

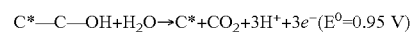

Here, C* is a carbon defect site.

In addition, hydrogen peroxide that may generate a radical attack that causes deterioration of an electrolyte membrane due to the following reaction may be generated.

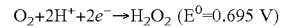

Accordingly, the controller 80 may perform a control to perform an EHP reaction within a range, in which the cell voltage of the fuel cell 10 does not increase and finish the EHP reaction when the change rate of the pressure increase of the anode or the output current of the fuel cell 10 over time is preset value or less.

In more detail, in the operation (S600) of generating electric power, the circuit (the power network) that may normally generate power may be constituted by opening the second COD relay 51 first and closing the first COD relay 64. Further, the air cut-off valve may be opened at the same time when hydrogen is supplied by opening a hydrogen supply valve and then air may start to be supplied to the air electrode of the fuel cell 10 by operating the air compressor.

Meanwhile, in a process of increasing the output voltage of the fuel cell 10 while, among the hydrogen that is diffused to the air electrode while crossing over through the polymer electrolyte membrane in a storage state after the hydrogen of the cathode flows to the anode through the EHP reaction, the hydrogen residing in the air electrode even after the EHP reaction is discharged, a section in which the small amount of hydrogen residing in the cathode and the oxygen in the air supplied by the air compressor coexist is generated. The duration of the section becomes shorter as the amount of air to the cathode through the air compressor becomes larger.

Accordingly, because a start process is performed in a state in which the concentration of hydrogen of the cathode, which is a cause of a mixed potential that may cause deterioration, such as corrosion of a carbon support or a radical attack, which may occur in the process of starting the fuel cell 10 is lowered to a half of that of a general case or less, the durability of the fuel cell 10 can be improved.

Although the present disclosure has been described and illustrated in conjunction with particular embodiments thereof, it should be apparent to those having ordinary skill in the art that various improvements and modifications may be made to the present disclosure without departing from the technical idea of the present disclosure defined by the appended claims.

What is claimed is:

1. A power net system of a fuel cell, the power net system comprising:
    a fuel cell configured to generate electric power through a reaction of a fuel gas and an oxidation gas;
    batteries configured to be charged by the electric power generated by the fuel cell or be discharged to supply electric power;
    main lines electrically connecting the fuel cell and the batteries;
    main relays provided in the main lines and configured to open or allow electrical connections between the fuel cell and the batteries;
    COD lines branched from the main lines between the fuel cell and the main relays and provided with a COD device configured to consume input electric power and be immersed in a coolant that cools the fuel cell;
    COD relays provided in the COD lines and configured to open or allow electrical connections to the COD device through the COD lines; and
    a controller configured to control the main relays or the COD relays to supply electric power charged in the batteries to the fuel cell.

2. The power net system of claim 1, wherein the main lines comprise a main positive electrode line connecting a positive electrode of the fuel cell and positive electrodes of the batteries and a main negative electrode line connecting a negative electrode of the fuel cell and negative electrodes of the batteries, and
    wherein the main relays comprise a first main relay located in the main positive electrode line and a second main relay located in the main negative electrode line.

3. The power net system of claim 2, wherein the COD lines comprise a positive electrode COD line branched from the main positive electrode line on a side, which is close to the fuel cell with respect to the first main relay, and a negative electrode COD line branched from the main negative electrode line on a side, which is close to the fuel cell with respect to the second main relay, and the COD device is connected to the positive electrode COD line and the negative electrode COD line to consume the electric power.

4. The power net system of claim 3, further comprising:
    a first COD relay provided in the positive electrode COD line or the negative electrode COD line to open or allow an electrical connection.

5. The power net system of claim 4, wherein at least one of the main positive electrode line or the main negative electrode line is provided with a diode that allows flows of currents only in one direction, and
    wherein the power net system further comprises:
    an EHP line electrically connecting the diode and the fuel cell in the main positive electrode line or the main negative electrode line and the first COD relay and the COD device in the positive electrode COD line or the negative electrode COD line; and
    a second COD relay provided in the EHP line to open or allow an electrical connection.

6. The power net system of claim 3, wherein the COD device maintains a state in which the positive electrode COD line and the negative electrode COD line are electrically connected to each other and the consumed electric power is controlled through switching control, and
    wherein the controller varies the electric power consumed in the COD device by switching the COD device.

7. The power net system of claim 1, wherein the main lines comprise a main positive electrode line connecting a positive electrode of the fuel and positive electrodes of the batteries and a main negative electrode line connecting a negative electrode of the fuel cell and negative electrodes of the batteries, and
    wherein the power net system further comprises:
    a current sensor located in the main positive electrode line or the main negative electrode line on a side, which is closer to the fuel cell, and configured to sense a current that is output from the fuel cell or input to the fuel cell.

8. The power net system of claim 7, wherein the COD lines comprise a positive electrode COD line branched from the main positive electrode line on a side, which is close to the fuel cell with respect to the first main relay, and a negative electrode COD line branched from the main negative line on a side, which is close to the fuel cell with respect to the second main relay, and
    wherein the power net system further comprises:
    an EHP line connecting the main positive electrode line and the negative electrode COD line when the current sensor is located in the main positive electrode line, or connecting the main negative electrode line and the positive COD line when the current sensor is located in the main negative line.

9. A method for controlling the power net system of the fuel cell of claim 1, the method comprising:
    stopping generation of electric power by the fuel cell;
    supplying the electric power stored in the batteries to the fuel cell such that a fuel of a cathode flows to an anode; and
    generating electric power through a reaction of the fuel gas and the oxidation gas in the fuel cell.

10. The method of claim 9, further comprising:
    performing a shutdown control of, when the generation of the electric power by the fuel cell is stopped through a start-off of the fuel cell in the stopping of generation of electric power by the fuel cell, decreasing the voltage of the fuel cell, after the generation of the electric power by the fuel cell is stopped,
    wherein the performing of the shutdown control comprises:
    opening the connections between the fuel cell and the batteries by opening the main relays after the electric power is consumed by the COD device in connection states of the COD relays.

11. The method of claim 9, wherein the performing of the shutdown control comprises:
    sequentially opening the main positive electrode line connecting the positive electrode of the fuel cell and the positive electrodes of the batteries and the main negative electrode line connecting the negative electrode of the fuel cell and the negative electrodes of the batteries.

12. The method of claim 9, further comprising:
    determining whether generation of electric power by the fuel cell is required through a start-on of the fuel cell or a release of an FC stop mode of the fuel cell, before hydrogen flows from the cathode to the anode,
    wherein the flowing of the hydrogen from the cathode to the anode comprises:

supplying the electric power stored in the batteries to the fuel cell when generation of electric power by the fuel cell is required.

13. The method of claim 9, wherein the flowing of the hydrogen from the cathode to the anode comprises:
discharging the batteries by controlling a bidirectional converter located between the fuel cell and the batteries and supplying the electric power discharged from the batteries to the fuel cell via the COD lines.

14. The method of claim 9, wherein the flowing of the hydrogen from the cathode to the anode comprises:
closing the positive COD line electrically connecting a side of the main positive line connecting the positive electrode of the fuel cell and the positive electrodes of the batteries, which is close to the batteries, and the positive electrode of the COD device, and closing the EHP line electrically connecting a side of the main positive electrode line, which is close to the fuel cell, and the negative electrode of the COD device.

15. The method of claim 14, wherein the flowing of the hydrogen from the cathode to the anode comprises:
changing the electric power consumed in the COD device through a switching control of the COD device that maintains a state in which the positive electrode COD line and the negative electrode COD line are electrically connected to each other.

* * * * *